Sept. 22, 1925.

F. C. WEAVER

PRECISION COMPARATOR

Filed Oct. 28, 1922

1,554,392

INVENTOR.
F. C. Weaver.
BY
ATTORNEYS.

Patented Sept. 22, 1925.

1,554,392

UNITED STATES PATENT OFFICE.

FLOYD C. WEAVER, OF WASHINGTON, DISTRICT OF COLUMBIA.

PRECISION COMPARATOR.

Application filed October 28, 1922. Serial No. 597,572.

*To all whom it may concern:*

Be it known that I, FLOYD C. WEAVER, a citizen of the United States, residing at Washington, District of Columbia, have invented certain new and useful Improvements in a Precision Comparator, of which the following is a specification, reference being had therein to the accompanying drawings.

This invention is a precision comparator and the principal object of the same is the provision of a device for the direct comparison of the dimensions of two bodies, as two gage blocks, with all the precision attainable by interferometer equipment at ordinary temperatures and under ordinary conditions by only the average skill and assistance to be found in a high grade machine tool department or of a measuring laboratory.

Another object of this invention is to provide a means of comparison of two dimensions simultaneously by light interference methods, such that an ordinary operator under ordinary conditions can make these comparisons readily, accurately and of the limit of interference comparisons of a few millionths of an inch, and using no accessory tools, but simply by noting certain indicating means on the device.

Figure 1:
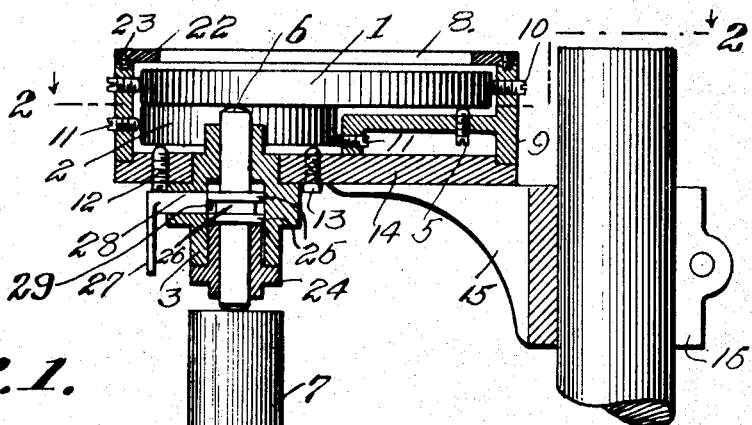
Figure 2:
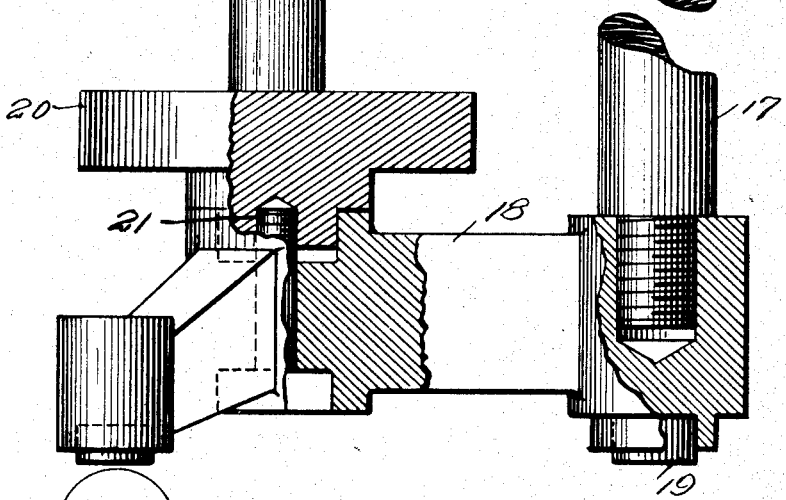
Figure 2:
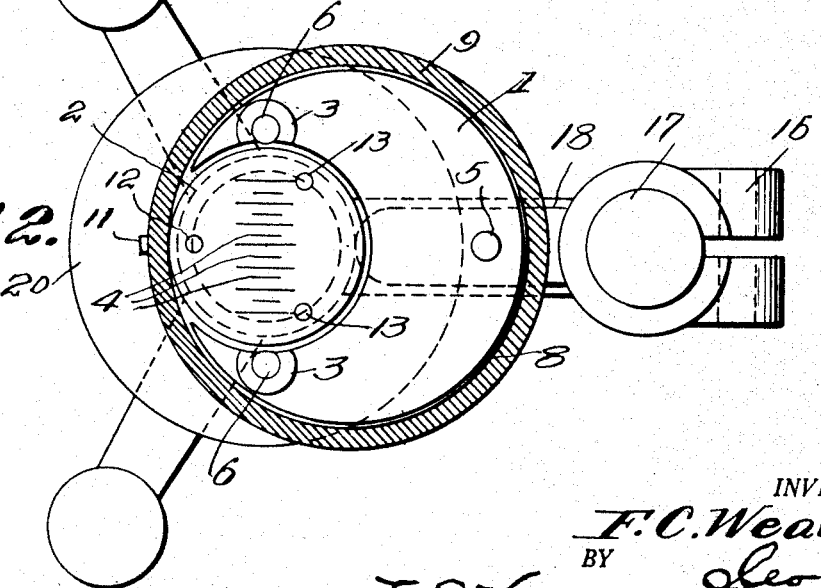

One practical form of construction and assembly of the present invention will be hereinafter described and is illustrated in the accompanying drawing, in which Fig. 1 is a side elevation of the precision comparator, partly in section and partly broken away, and Fig. 2 is a sectional view taken on the line 2—2 of Fig. 1 and looking in the direction of the arrows.

In the accompanying drawing the numeral 1 indicates an upper interference surface which is preferably formed of transparent glass but may be formed of any suitable transparent material. This interference surface is formed as a circular disc which is of an even thickness at all points to provide parallel upper and lower faces. The lower interference surface 2 is also formed as a circular disc which is of the same thickness as the disc 1 and provided with parallel upper and lower faces. This lower disc is however a great deal smaller than the disc 1 and may be formed of transparent or opaque material. A scale 4 has been shown provided upon the disc 2 but it will be understood that it may be provided upon the disc 1 instead of the disc 2 if so desired. By this arrangement of parts the scale 4 can be viewed when looking down upon the disc 4 and Haidinger fringes which will appear when mono-chromatic light is directed upon the upper disc may be compared with the scale.

These Haidinger fringes will be referred to hereafter as interference circles as in some cases the disc will be formed with curved faces and Newton's rings would then appear instead of Haidinger fringes. These rings will be centered upon the scale and by moving the eye from one end of the scale to the other the size of the rings can be observed. If the rings remain the same size the discs will then be exactly parallel but if the discs are not parallel the rings will increase or decrease in diameter according to the direction in which the upper disc is tilted. This will be more fully brought out when the operation of the apparatus is set forth.

In order to mount the discs there has been provided a cell or casing having a base 14, an annular wall 9 and an upper ring 22 secured upon the wall 9 by screws 23 and providing an inwardly extending annular flange. A web 8 is provided in this cell and is provided with an offset recess receiving disc 2. This web has also been provided with a depending flange which rests upon the base 14 and carries one of the threaded pins 11 which engages the edge face of the disc 2 and assist in properly mounting this disc. Threaded pins 12 and 13 extend upwardly through the base with their upper ends engaging the disc as shown so that by properly adjusting the screws 12 and 13 the disc can be supported in a horizontal plane. The disc 1 is to be tiltable in the casing and therefore has been mounted between pivot pins 10 and at one point rests upon a pin 5 which is threaded through the upper web 8 and corresponds to the pin 12. Sockets 3 are mounted in the base at opposite sides of the recess in which the disc 2 is mounted and each is provided with a base in which is slidably mounted a pin 6 which correspond to the pins 13 and are to engage the under face of the disc 1 so that this disc can be held in a horizontal plane or be allowed to tilt to one side or the other. Each of these pins 6 passes through a bushing 24 and above the bushing is provided with spaced collars 25 which provide an annular pocket 26 to receive an eccentric pin 29 extending from the inner end of a key 28. This key 28 is rotatable in the socket 3 and is provided with a handle 27 so that the key may be rotated to move a pin 6 vertically. This permits the blocks to be put in place.

This casing is to be mounted above a platform 20 which has a flat upper surface and is to constitute a master surface in that it is to be exactly horizontal and is to support a measuring block 7 and a block to be measured. This platform 20 rests upon a base 18 having radiating arms carrying friction pads 19 and is held in place by a screw 21 which projects upwardly through the base axially thereof. One arm of this base is provided with a threaded socket into which the threaded lower end of a post 17 is received and this post is circular in cross section so that it may slidably receive the clamp portion 16 of the bracket arm 15 extending from the casing. This clamp portion will be provided with the usual adjusting screw so that it may be secured in a set position upon the post with the casing at the desired distance above the master surface or platform 20.

When this device is in use the casing will be set at the proper distance above the platform according to the size of the blocks to be measured and a master block 7 of a known height will be placed upon the platform and the lower end of one pin 6 allowed to rest upon the upper end of the master or measuring block.

The block to be measured is then placed upon the platform beneath the second pin 6 and will have its upper end engaged by this second pin. The upper ends of the pins will engage the under face of the disc 1 and if the blocks are of the same height the disc 1 will be parallel to the disc 2 whereas if the block to be measured is taller or shorter than the master block the disc 1 will be tilted to one side or the other. This can be accurately determined by observing the interference rings which the light projected onto the disc causes to appear above the scale 4. While looking down upon the disc, the eye is caused to travel from one end of the scale to the other and if the rings remain the same size at all points along the scale the two discs are parallel and it will be known that the blocks are of the same height. If the block to be measured is taller than the master block then the disc 1 at this end of the scale is a greater distance from the disc 2 than at the other end and this tilting away from the disc 2 causes the rings to increase in size towards this end of the scale. If the block to be measured is shorter than the master block the disc 1 at this end of the scale is closer to the disc 2 and therefore the rings will be reduced in size as the eye moves along the scale.

A table can be worked out so that when a difference in the size of a ring is observed the table will give the variation in the height of the block being measured. This variation may by the use of this device be computed to a very minute fraction of an inch. It will therefore be seen that the blocks can be very accurately measured.

The invention having been described, what is claimed is:

1. In a device of the character described, a master surface, vertically adjustable pins mounted above the master surface, and interference surfaces positioned above the master surface in superimposed relation to each other, one being held parallel to the master surface and the other tiltably mounted and controlled in its tilting movement by said pins and one of said interference surfaces having gage markings thereon.

2. In a device of the character described, a master surface, a cell, a supporting structure for the master surface and cell, interference surfaces in said cell in superimposed relation, one being stationary and the other tiltable and one being provided with gage markings, and vertically movable pins carried by said cell for having their lower ends engaging articles placed upon the master surface and their upper ends engaging the tiltable interference surface at opposite sides of its line of pivotal mounting.

3. In a device of the character described, a master surface, a cell, means for supporting the master surface and cell, interference surfaces carried within said cell, one of the interference surfaces being provided with gage markings and one being tiltable, vertically movable pins carried by said cell, and means for shifting said pins, the tiltable interference being supported by said pins and the pins being adapted to engage the upper surfaces of articles placed upon the master surface whereby tilting of the tiltable interference surface may be controlled by the height of the articles with respect to each other.

4. In a device of the character described, the combination of a master surface, a cell, means for supporting said master surface and said cell and adapted to rest upon the upper surfaces of articles resting upon the master surfaces, vertically movable pins carried by said cell, said pins having enlarged bosses provided with horizontal grooves, levers having shanks provided with eccentrically arranged pins extending into said grooves, whereby when the levers are swung the first-mentioned pins will be shifted, and interference surfaces carried within said cell in superimposed relation, one of the interference surfaces having gage markings thereon and one being pivotally mounted and resting upon the vertically movable pins and adapted to be moved into and out of a plane parallel to the master surface and other interference surface by the movable pins.

5. In a device of the class described, the combination of a supporting surface and a cell, means for supporting said surface and said cell, said cell being circular and having a base and a web extending above the base, bushings carried by said base, vertically adjustable pins carried by said bushings and extending into said cell, the lower ends of said pins being adapted to engage the upper faces of articles resting upon the supporting surface, and adjustable screw carried by said web, an upper interference surface resting upon said pins and said screw, vertically adjustable screws and points carried by said base, a lower interference surface positioned within said cell and resting upon said last-mentioned screws and points and being positioned between said first mentioned pins, horizontally extending screws carried by said cell and the web thereof and engaging the peripheries of said interference surfaces for holding them from shifting laterally, and gage marks upon one of said interference surfaces, all as and for the purposes set forth.

In testimony whereof I hereunto affix my signature.

FLOYD C. WEAVER.